United States Patent
Pitchai et al.

(10) Patent No.: US 9,363,178 B2
(45) Date of Patent: Jun. 7, 2016

(54) METHOD, APPARATUS, AND SYSTEM FOR SUPPORTING FLEXIBLE LOOKUP KEYS IN SOFTWARE-DEFINED NETWORKS

(71) Applicant: Telefonaktiebolaget L M Ericsson (publ), Stockholm (SE)

(72) Inventors: Sridhar Pitchai, San Jose, CA (US); Mark Hlady, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 154 days.

(21) Appl. No.: 14/168,827

(22) Filed: Jan. 30, 2014

(65) Prior Publication Data

US 2015/0172189 A1    Jun. 18, 2015

Related U.S. Application Data

(60) Provisional application No. 61/917,914, filed on Dec. 18, 2013.

(51) Int. Cl.
| | |
|---|---|
| *H04L 12/741* | (2013.01) |
| *H04L 29/06* | (2006.01) |
| *H04L 12/743* | (2013.01) |
| *H04L 12/721* | (2013.01) |

(Continued)

(52) U.S. Cl.
CPC ............. *H04L 45/745* (2013.01); *H04L 45/38* (2013.01); *H04L 45/7453* (2013.01); *H04L 69/22* (2013.01); *H04L 45/42* (2013.01); *H04L 45/64* (2013.01)

(58) Field of Classification Search
CPC ....... H04L 45/745; H04L 45/38; H04L 69/22; H04L 45/7453; H04L 45/64; H04L 45/42
USPC ............... 370/351, 352, 355, 357, 392, 389, 370/395.1, 398, 395.3, 395.31, 422, 427
See application file for complete search history.

(56) References Cited

U.S. PATENT DOCUMENTS

| | | | |
|---|---|---|---|
| 2005/0147113 A1* | 7/2005 | Brown | 370/428 |
| 2006/0002386 A1 | 1/2006 | Yik et al. | |
| 2011/0314154 A1* | 12/2011 | Resch et al. | 709/225 |

(Continued)

OTHER PUBLICATIONS

Attig, et al., "400 Gb/s Programmable Packet Parsing on a Single FPGA," Architectures for Networking and Communications Systems (ANCS), 2011 Seventh ACM/IEEE Symposium ON, IEEE, Oct. 3, 2011, pp. 12-23.

(Continued)

*Primary Examiner* — Obaidul Huq
(74) *Attorney, Agent, or Firm* — Nicholson De Vos Webster & Elliott, LLP

(57) ABSTRACT

A method is described in a network element for supporting flexible lookup keys in a software-defined network. The method includes receiving a packet to be forwarded and determining a next hop for the packet, which includes parsing the packet to identify a superkey comprising a plurality of header field values of the packet; identifying a superkey mask value and a superkey offset value for a first lookup table of a set of one or more lookup tables; generating a table key for the first lookup table based upon the superkey mask value, the superkey offset value, and the superkey; and performing a lookup in the first lookup table using the table key. The lookup identifies an entry of the first lookup table indicating the next hop for the packet. The packet may then be forwarded to the next hop.

20 Claims, 5 Drawing Sheets

(51) Int. Cl.
H04L 12/715 (2013.01)
H04L 12/717 (2013.01)

(56) References Cited

U.S. PATENT DOCUMENTS

| | | | |
|---|---|---|---|
| 2013/0054761 A1 | 2/2013 | Kempf et al. | |
| 2013/0163475 A1 | 6/2013 | Beliveau et al. | |
| 2014/0301394 A1* | 10/2014 | Arad et al. | 370/392 |
| 2015/0124805 A1* | 5/2015 | Yadav et al. | 370/389 |

OTHER PUBLICATIONS

"OpenFlow Switch Specification", Version 1.4.0 (Wire Protocol 0x05), Oct. 14, 2013, 205 pages.
RFC: 768: Postel, "User Datagram Protocol," Aug. 28, 1980, 3 pages, Network Working Group, Request for Comments: 768.
RFC 793: "Transmission Control Protocol, DARPA Internet Program Protocol Specification," Sep. 1981, 91 pages, Network Working Group, Request for Comments: 793.
RFC 1058: Hedrick, "Routing Information Protocol," Jun. 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Jan. 1991, 28 pages, Network Working Group, Request for Comments: 1180.
RFC 2080: Malkin, et al., "RIPng for IPv6," Jan. 1997, 19 pages, Network Working Group, Request for Comments: 2080.
RFC 2205: Braden, et al., "Resource ReSerVation Protocol (RSVP)—Version 1 Functional Specification," Sep. 1997, 112 pages, Network Working Group, Request for Comments: 2205.
RFC 2210: Wroclawski, "The Use of RSVP with IETF Integrated Services," Sep. 1997, 33 pages, Network Working Group, Request for Comments: 2210.
RFC 2211: Wroclawski, "Specification of the Controlled-Load Network Element Service," Sep. 1997, 19 pages, Network Working Group, Request for Comments: 2211.
RFC 2212: Shenker, et al., "Specification of Guaranteed Quality of Service," Sep. 1997, 20 pages, Network Working Group, Request for Comments: 2212.
RFC 2328: MOY, "OSPF Version 2," Apr. 1998, 244 pages, Network Working Group, Request for Comments: 2328, The Internet Society.
RFC 2453: Malkin, "RIP Version 2," Nov. 1998, 39 pages, Network Working Group, Request for Comments: 2453, The Internet Society.
RFC 2460: Deering, et al., "Internet Protocol, Version 6 (IPv6) Specification," Dec. 1998, 39 pages, Network Working Group, Request for Comments: 2460, The Internet Society.
RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.
RFC 2475: Blake, et al., "An Architecture for Differentiated Services," Dec. 1998, 36 pages, Network Working Group, Request for Comments: 2475, The Internet Society.
RFC 2597: Heinanen, et al., "Assured Forwarding PHB Group," Jun. 1999, 11 pages, Network Working Group, Request for Comments: 2597, The Internet Society.
RFC 2675: Borman, et al., "IPv6 Jumbograms," Aug. 1999, 9 pages, Network Working Group, Request for Comments: 2675, The Internet Society.
RFC 2983: Black, "Differentiated Services and Tunnels," Oct. 2000, 14 pages, Network Working Group, Request for Comments: 2983, The Internet Society.
RFC 3086: Nichols, et al., "Definition of Differentiated Services Per Domain Behaviors and Rules for their Specification," Apr. 2001, 24 pages, Network Working Group, Request for Comments: 3086, The Internet Society.

RFC 3140: Black, et al., "Per Hop Behavior Identification Codes," Jun. 2001, 8 pages, Network Working Group, Request for Comments: 3140, The Internet Society.
RFC 3209: Awduche, et al., "RSVP-TE: Extensions to RSVP for LSP Tunnels," Dec. 2001, 61 pages, Network Working Group, Request for Comments: 3209, The Internet Society.
RFC 3246: Davie, et al., "An Expedited Forwarding PHB (Per-Hop Behavior)," Mar. 2002, 16 pages, Network Working Group, Request for Comments: 3246, The Internet Society.
RFC 3260: Grossman, "New Terminology and Clarifications for Diffserv," Apr. 2002, 10 pages, Network Working Group, Request for Comments: 3260, The Internet Society.
RFC 3289: Baker, et al., "Management Information Base for the Differentiated Services Architecture," May 2002, 116 pages, Network Working Group, Request for Comments: 3289, The Internet Society.
RFC 3290: Bernet, et al., "An Informal Management Model for Diffserv Routers," May 2002, 56 pages, Network Working Group, Request for Comments: 3290, The Internet Society.
RFC 3317: Chan, et al., "Differentiated Services Quality of Service Policy Information Base," Mar. 2003, 96 pages, Network Working Group, Request for Comments: 3317, The Internet Society.
RFC 3473: Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
RFC 3936: Kompella, et al., "Procedures for Modifying the Resource reSerVation Protocol (RSVP)," Oct. 2004, 7 pages, Network Working Group, Request for Comments: 3936, The Internet Society.
RFC 4113: Fenner, et al., "Management Information Base for the User Datagram Protocol (UDP)," Jun. 2005, 19 pages, Network Working Group, Request for Comments: 4113, The Internet Society.
RFC 4271: Rekhter, et al., "A Border Gateway Protocol 4 (BGP-4)," Jan. 2006, 104 pages, Network Working Group, Request for Comments: 4271, The Internet Society.
RFC 4301: Kent, et al., "Security Architecture for the Internet Protocol," Dec. 2005, 101 pages, Network Working Group, Request for Comments: 4301, The Internet Society.
RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.
RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.
RFC 4594: Babiarz, et al., "Configuration Guidelines for DiffServ Service Classes," Aug. 2006, 57 pages, Network Working Group, Request for Comments: 4594, The Internet Society.
RFC 5036: Andersson, et al., "LDP Specification," Oct. 2007, 135 pages, Network Working Group, Request for Comments: 5036, The IETF Trust.
RFC 5340: Coltun, et al., "OSPF for IPv6," Jul. 2008, 94 pages, Network Working Group, Request for Comments: 5340, The IETF Trust.
RFC 5405: Eggert, et al., "Unicast UDP Usage Guidelines for Application Designers," Nov. 2008, 27 pages, Network Working Group, Request for Comments: 5405, IETF Trust and the persons identified as the document authors.
RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

Figure 5

```
sdnResult_t sdn_lookup( sdnTableId, superKey )
{
    byte sdnKey[KEY_LEN];

sdtResult = lookup( table = SDT, key = sdnTableId );

copy(sdnKey, &superKey[ sdtResult.superKeyOffset ], KEY_LEN );
    and(sdnKey, sdtResult.superKeyMask, KEY_LEN );

sdnResult = lookup( table = sdtResult.npTableId, key = sdnKey );

return sdnResult;
}
```

500

METHOD, APPARATUS, AND SYSTEM FOR SUPPORTING FLEXIBLE LOOKUP KEYS IN SOFTWARE-DEFINED NETWORKS

CROSS REFERENCE TO RELATED APPLICATIONS

This application claims priority to U.S. Provisional Patent Application No. 61/917,914, entitled "Method, Apparatus, and System for Supporting Flexible Lookup Keys in Software-Defined Networks", filed on Dec. 18, 2013 respectively, which are hereby incorporated by reference.

FIELD

Embodiments of the invention relate to the field of networking; and more specifically, to supporting flexible lookup keys in software-defined networks.

BACKGROUND

In recent years, traditional circuit-based communication networks have declined in favor of packet-based networks, which can be more flexible, efficient, and secure. As a result, the increased popularity of packet-based networking has led to growth in demand for packet-based network devices. This demand has largely been met by manufacturers, who have created larger and larger monolithic routers to handle the increased volume and complexity of network traffic. However, this model is approaching its technologic and economic limits. It is now increasingly difficult to fulfill increasing performance requirements with traditional router designs, and, with the emergence of low cost data center hardware, router vendors have difficulty justifying the higher costs of hardware for the same performance. At the same time, the demands on the routing and switching control plane in access and aggregation networks are becoming more complex. Operators desire the ability to customize routing to handle specific types of traffic flows near the edge, configure customized services that span aggregation networks, and achieve multi-layer integration, without the detailed low-level configuration required in today's networks.

These trends led to a different approach to network architectures in which the traditional data and control planes have been decoupled. With this separation, the control plane may be logically centralized and implemented with commercial off-the-shelf (COTS) hardware. Further, the data plane may consist of simplified switch/router devices configured by the logically centralized controller. This new model focuses on the split of control from forwarding and data processing elements and is at the core of software-defined networking (SDN). One prominent standard for flow processing in software-defined networks is OpenFlow, which defines a protocol used to transport messages between the control plane and the forwarding plane and describes a model for packet processing.

This split responsibility present in software-defined networks enables a separation between functionalities that can be logically or physically grouped together. For example, there can be a split or separation between a common control entity and a network application (e.g., Generalized Multi-Protocol Label Switching (GMPLS), Border Gateway Protocol (BGP), Internet Protocol Security (IPSec), etc.). Similarly, there can be a split or separation between control and forwarding/processing (i.e. a separation of central control from network devices performing packet processing). There also can be a split or separation of a data forwarding functionality, a data processing functionality, and a data generation functionality (e.g., Deep Packet Inspection (DPI); Ciphering; Operations, Administration and Management (OAM)).

Software-defined networks present many advantages over traditional monolithic architecture networks. For example, in SDNs the control plane applications that implement important network routing and switching functionalities are completely separated from the forwarding plane. Thus, the centralized control planes of SDNs enable highly customized and optimized networking services that can be tailored to specific user needs, and can provide a highly scalable, reliable, and flexible networking infrastructure. Further, the forwarding plane network devices can be inexpensive and interchangeable commodity networking devices, which reduces the overall configuration and maintenance burdens for the user. Additionally, the use of a single management and configuration entity for the entire network enhances the ease-of-use experience for users.

However, since the network elements (i.e. forwarding elements) of the forwarding plane will not generally know what sort of forwarding behavior the controller will request, they must support a wide variety of valid behaviors according to the relevant SDN protocol(s) in use.

Forwarding planes on high-speed networking switches and routers are generally implemented in hardware with varying flexibility. Some of the fastest networking devices will use forwarding Application Specific Integrated Circuits (ASICs) designed for specific behaviors such as basic Ethernet bridging, or basic Internet Protocol (IP) routing. Another class of network devices will use Network Processors (NP) to improve programmability and flexibility at the cost of some forwarding performance. Yet another class of networking device will use more general-purpose processors in the datapath, which allows for tremendous flexibility but at the expense of the slowest performance. In all these three models, forwarding is generally table-driven, with forwarding behavior determined by one or more lookups in some sort of lookup table, using packets header field values such as Media Access Control (MAC) addresses or IP addresses as keys or parts of keys.

Although NPs are flexible and programmable, current devices are not designed with enough flexibility to accommodate a typical SDN protocol such as OpenFlow. Thus, the implementation of the OpenFlow protocol on a Network Processor is possible but presents challenges that will vary depending on the specific NP.

One major challenge is how to support table lookups when the types of tables are not defined in advance and when the types of tables may change over time. A typical router implementation built on an NP might define a table structure to extract the packet's destination IP address ("Dest-IP") and use that as a key to a route table. However, a typical SDN application might prefer to define a table that uses the Dest-IP and also the Destination Transmission Control Protocol (TCP) port ("Dest-TCP-port") as the key, but the definition of this table is not known while building the SDN-capable network node. Further, in the OpenFlow protocol, for example, there are approximately 40 defined match fields that must be supported by a forwarding element, as the OpenFlow controller can define a table—during runtime—using any combination of these fields.

Accordingly, it would be desirable to have the ability, in a network element, to incorporate the performance benefits of ASIC-based or NP-based forwarding elements (which are often unable to support the runtime creation of tables using flexible keys) along with the flexibility of general-purpose processor based forwarding elements (which often have poor performance) to support software-defined networking.

SUMMARY

According to an embodiment, a method in a network device acting as a forwarding element in a software-defined network is described for supporting flexible lookup table keys. The method includes receiving, at a set of one or more network interfaces of the network device, a packet to be forwarded. The method further includes determining a next hop for the packet. The determining includes parsing the packet to identify a superkey comprising a plurality of header field values of the packet. The determining also includes identifying a superkey mask value and a superkey offset value for a first lookup table of a set of one or more lookup tables. The determining also includes generating a table key for the first lookup table based upon the superkey mask value, the superkey offset value, and the superkey. The determining also includes performing a lookup in the first lookup table using the table key to identify an entry of the first lookup table indicating the next hop for the packet. The method further includes transmitting, using the set of network interfaces, the packet to the next hop.

According to an embodiment, a network device acting as a forwarding element in a software-defined network is described that supports flexible lookup table keys. The network device includes a set of one or more network interfaces configured to couple the network device with the software-defined network, and receive packets to be forwarded. The network device also includes a parse module coupled to the set of network interfaces, and configured to generate superkeys for the received packets. Each superkey comprises a plurality of header field values of the respective received packet. The network device also includes a lookup module coupled to the parse module. The lookup module is configured to identify superkey mask values and superkey offset values for one or more lookup tables of a set of one or more lookup tables. The lookup module is also configured to generate table keys for the one or more lookup tables. Each generated table key is to be based upon a respective superkey mask value, a respective superkey offset value, and a respective superkey. The lookup module is also configured to perform lookups in one or more lookup tables using the table keys to identify one or both of: sets of actions to be performed for the packets, and next hops for the packets. The network device also includes a packet action module coupled to the lookup module and the set of network interfaces. The packet action module is configured to cause the packets to be forwarded according to the lookups performed by the lookup module.

According to an embodiment, a system is described that supports flexible keys in a software-defined network. The system includes one or more network devices acting as one or more forwarding elements in the software-defined network. A first network device of the one or more network devices includes a set of one or more network interfaces that couples the first network device with the software-defined network and receives packets to be forwarded. The first network device also includes a parse module coupled to the set of network interfaces that generates superkeys for the received packets. Each superkey comprises a plurality of header field values of the respective received packet. The first network device also includes a lookup module coupled to the parse module. The lookup module identifies superkey mask values and superkey offset values for one or more lookup tables of a set of one or more lookup tables. The lookup module also generates table keys for the one or more lookup tables. Each generated table key is to be based upon a respective superkey mask value, a respective superkey offset value, and a respective superkey. The lookup module also performs lookups in one or more lookup tables using the table keys to identify one or both of sets of actions to be performed for the packets and next hops for the packets. The first network device also includes a packet action module coupled to the lookup module and the set of network interfaces that causes the packets to be forwarded according to the lookups performed by the lookup module. In addition to the one or more network devices acting as the one or more forwarding elements in the software-defined network, the system also includes a controller communicatively coupled with the one or more forwarding elements. The controller transmits, to the one or more forwarding elements, commands that indicate a configuration of the lookup tables.

Embodiments of the invention allow for fast forwarding plane performance (e.g., without needing to rely heavily upon slower general-purpose processors) while still providing tremendous flexibility in terms of what flow tables are being used and what packet header field values are being used to generate lookup keys for those flow tables.

BRIEF DESCRIPTION OF THE DRAWINGS

The invention may best be understood by referring to the following description and accompanying drawings that are used to illustrate embodiments of the invention. In the drawings:

FIG. 5 illustrates pseudo-code used with a software definition table in a system supporting flexible lookup keys in a software-defined network according to an embodiment of the invention.

DESCRIPTION OF EMBODIMENTS

Figure 1:
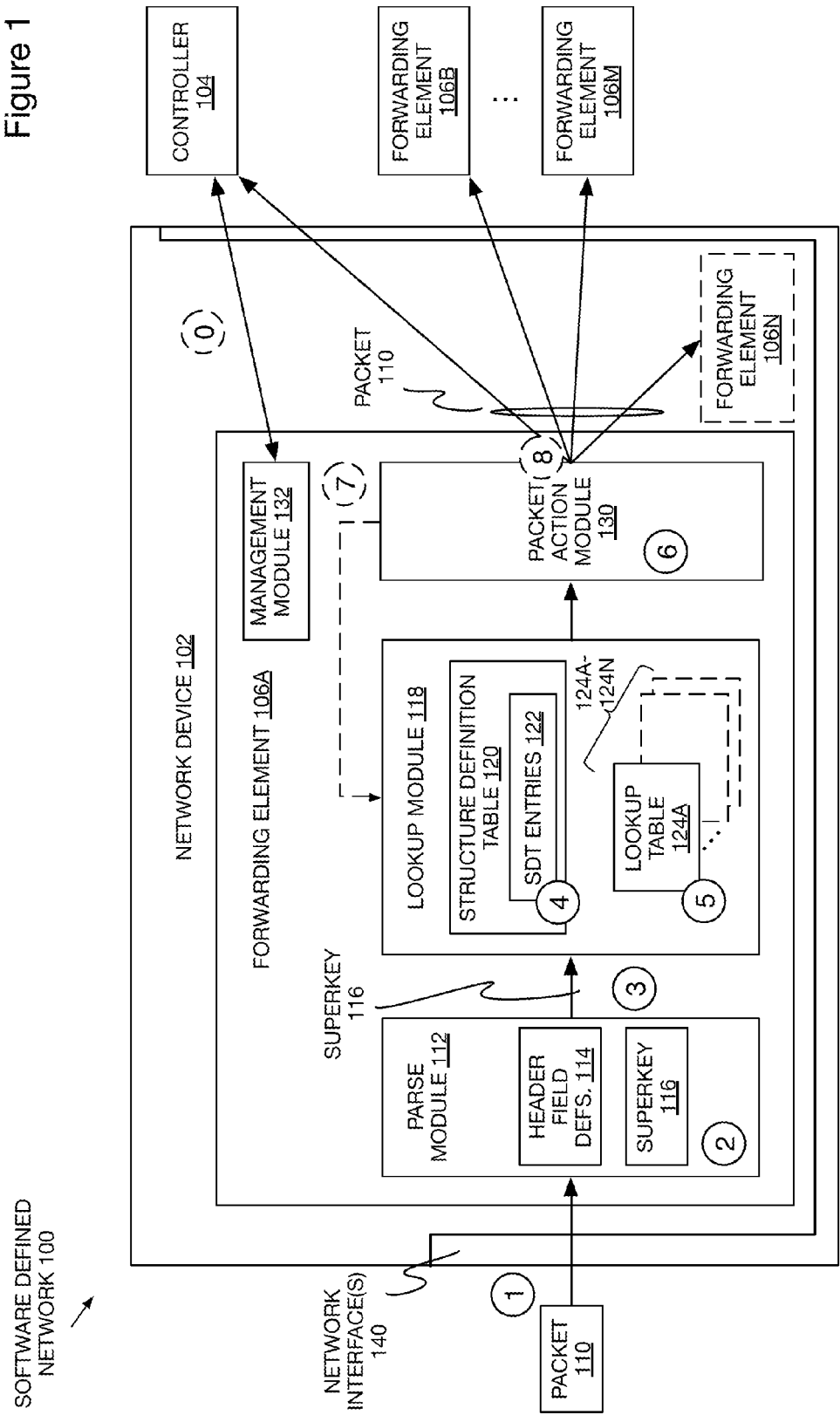
FIG. 1 illustrates a block diagram of a system for supporting flexible lookup keys in a software-defined network according to an embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) shall be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. For layer 2 forwarding, the network device can store one or more bridging tables that are used to forward data based on the layer 2 information in that data.

Typically, a network device includes one or more processing cards, which may include a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. Of course, some network devices may not have all of these types of cards; a network device in a SDN may include just line cards, or line cards and service cards, for example.

As used herein, a network element (also referred to as a "forwarding element", "network forwarding element", and/or "node") is an entity implemented by a network device and that forwards packets on the basis of some information in the packet. For example, for IP packets, the information in the packet may include the source IP address, destination IP address, source port, destination port (where "source port"

and "destination port" refer herein to protocol ports, as opposed to physical ports of a network device), transport protocol (e.g., user datagram protocol (UDP) (RFCs 768, 2460, 2675, 4113, and 5405), Transmission Control Protocol (TCP) (RFC 793 and 1180), and differentiated services (DSCP) values (RFCs 2474, 2475, 2597, 2983, 3086, 3140, 3246, 3247, 3260, 4594, 5865, 3289, 3290, and 3317). A physical network element is implemented directly on the network device, whereas a virtual network element is the execution of software and the portion of network device hardware that it executes on. Thus, multiple virtual network elements may be implemented on a single network device, and each of the virtual network elements includes software and the portions of the underlying hardware that implement the virtual network elements.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a network element (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a network element implemented on a network device, can be referred to as IP addresses of that network element.

Software-Defined Networks

Unlike monolithic network architectures that require complex network management functions to be distributed in the control planes of multifunctional network elements throughout the network, and further require complex data and control planes integrated into the same multifunctional network element, a flow-based software-defined network allows the data planes of the network to be separated from the control planes. Data planes can be implemented using simple discrete flow switches (forwarding elements) distributed throughout the network, and the control planes providing the network's intelligence may be implemented in a centralized flow controller that oversees the flow switches. By decoupling the control function from the data forwarding function, software-defined networking eases the task of modifying the network control logic and provides a programmatic interface upon which developers can build a wide variety of new routing and protocol management applications. This allows the data and control planes to evolve and scale independently, while reducing the management necessary for the data plane network components.

The control plane, or controller, typically controls the forwarding elements in the forwarding plane through a control plane signaling protocol over a secure and reliable transport connection between the forwarding elements and the controller. The controller typically includes an operating system that provides basic processing, I/O, and networking capabilities.

A middleware layer provides the context of the software-defined network to the operating system and communicates with various forwarding plane network elements using a control plane signaling protocol. An application layer over the middleware layer provides the intelligence required for various network operations such as protocols, network situational awareness, and user-interfaces. At a more abstract level, the application layer works with a logical view of the network and the middleware layer provides the conversion from the logical view to the physical view.

In some software-defined network paradigms, each forwarding element is a flow switching enabled network device. The flow switching enabled network device forwards packets based on the flow each packet belongs to instead of the destination IP address within the packet, which is typically used in current conventional packet-switched IP networks. A flow may be defined as a set of packets whose headers (i.e. header field values) match a given pattern of bits. In this sense, traditional IP forwarding is also flow-based forwarding where the flow is defined by the destination IP address only. However, instead of just considering the destination IP address or the source IP address, though, generic flow definitions allow many header fields (e.g., 10 or more) in the packet headers to be considered.

The control plane (i.e., controller) transmits relevant messages to a forwarding element based on application layer calculations and middleware layer mapping for each flow. The forwarding element processes these messages and programs the appropriate flow information and the corresponding actions in its flow tables (also referred to herein as "lookup tables"). The forwarding element maps packets to flows and forwards packets based on these flow tables. Of course, flow tables may be implemented in a variety of data structures, such as maps, lists, arrays, files, tables, hash tables, relational databases, etc. Further, the discussion of columns and rows within these tables is arbitrary; while one implementation may choose to put entries in rows it is trivial to modify the data structure to put entries in columns instead. In addition, the forwarding element may need to have data processing and data generation capabilities for such importation operations as DPI, NetFlow data collection, OAM, etc.

Standards for flow processing define the protocols used to transport messages between the control and the forwarding plane and describe the model for the processing of packets. This model for processing packets in flow processing devices includes header parsing, packet classification (also referred to as "lookup processing"), making forwarding decisions, and optionally performing actions.

Header parsing describes how to interpret the packet based upon a well-known set of protocols (e.g., Ethernet, virtual local area network (VLAN), multiprotocol label switching (MPLS), IPv4, etc.). Some layers of headers contain fields including information about how to de-multiplex the next header. For example, an Ethernet header includes a field describing what type of header is in the next layer. Some protocol fields are used to build a match structure (or key) that will be used in packet classification. For example, a first key field could be a source media access control (MAC) address, and a second key field could be a destination MAC address.

Packet classification typically involves executing a lookup in memory to classify the packet by determining which flow entry in the flow tables best matches the packet based upon the match structure, or key, of the flow entries. It is possible that many flows can correspond to a packet; in this case the system is typically configured to determine one flow from the many flows according to a defined scheme (e.g. selecting a first flow entry that is matched).

Making forwarding decisions and performing actions occurs based on the flow entry identified in the previous step of packet classification by executing actions using the packet. Each flow in the flow table may be associated with (or include, or otherwise identify) a set of actions to be executed for each corresponding packet. For example, actions may include pushing a header onto the packet, popping a header off the packet, forwarding the packet using a particular port or network interface, flooding the packet using multiple network interfaces, or simply dropping (i.e., not forwarding) the packet. For example, a flow entry for IPv4 packets with a particular transmission control protocol (TCP) destination port could contain an action specifying that these packets should be dropped.

In some SDN configurations, when an unknown packet (for example, a "missed packet" or a "match-miss" as used in OpenFlow parlance) arrives at the data plane (e.g., at a forwarding element), the packet—or a subset of the packet header and content—may be immediately forwarded to the controller. The controller, which executes software that defines a process for deciding how to handle packets and program corresponding entries in the data-plane, then programs flow table entries (also known as flow entries) into forwarding elements in the data plane to accommodate packets belonging to the flow of the unknown packet. In some instances, upon the controller receiving a "missed" packet from a forwarding element, the controller will also forward the packet to a destination that it determines to be appropriate. This controller-based forwarding is sometimes referred to as slow-path processing.

Among other pieces of information, programmed flow table entries can define both a specific set of match criteria (a set of values or wildcards, or an indication of what portions of a packet should be compared to a particular value/values/wildcards, as defined by the data plane's matching capabilities—i.e.—for specific fields in the packet header, or for some other packet content), and an action or set of actions for the data plane to take on receiving a matching packet. However, the programmed match criteria may only match a subset of packets that may be received (either for a port or the system). In this likely case, additional "unknown" packets are typically forwarded to the controller.

Once a specific flow table entry has been programmed by the controller, when a next packet with matching credentials arrives at the network element, the packet will match the created entry in the data plane and the forwarding element will take the action(s) associated with the matched entry.

Supporting Flexible Lookup Keys in Software-Defined Networks

Embodiments of the invention allow for network elements to flexibly support differing lookup keys in software-defined networks. In some embodiments, these network elements may be implemented with ASIC-based or NP-based forwarding elements that still have the flexibility (typically only offered by general-purpose processor based forwarding elements) to support dynamically created and/or modified lookup keys and lookup tables.

According to an embodiment of the invention, a forwarding plane network element uses a helper table referred to as a Structure Definition Table (SDT) to store definitions related to each SDN-defined lookup table (i.e., flow table). The SDT, in some embodiments, is not known to the SDN controller, but instead is used internally by the network element to flexibly generate lookup keys for use with the SDN lookup tables.

In an embodiment of the invention, upon receipt of a packet, parsing logic (e.g., a parse module) of the forwarding plane network element will first "extract" all supported packet fields that might be required as keys to SDN tables and pack them in a well-defined SuperKey structure.

In an embodiment, the SuperKey comprises the packet header field values (and related data) defined by the OpenFlow Specification v1.4: the switch input port, the switching physical input port, metadata passed between tables, Ethernet destination address, Ethernet source address, Ethernet frame type, VLAN ID, VLAN priority, IP DSCP (6 bits in ToS field), IP ECN (2 bits in ToS field), IP protocol, IPv4 source address, IPv4 destination address, TCP source port, TCP destination port, UDP source port, UDP destination port, Stream Control Transmission Protocol (SCTP) source port, SCTP destination port, Internet Control Message Protocol (ICMP) type, ICMP code, Address Resolution Protocol (ARP) opcode, ARP source IPv4 address, ARP target IPv4 address, ARP source hardware address, ARP target hardware address, IPv6 source address, IPv6 destination address, IPv6 flow label, ICMPv6 type, ICMPv6 code, target address for ND, source link-layer for ND, target link-layer for ND, MPLS label, MPLS Traffic Class (TC), MPLS Bottom of Stack (BoS) bit, Provider Backbone Bridging (PBB) Backbone Service Instance Identifier (I-SID), logical port metadata, and the IPv6 Extension header pseudo-field. However, in other embodiments, more, fewer, and/or different packet header values may be included in the SuperKey.

In an embodiment, each SDN table (as required by the controller) has an associated entry in the SDT. This associated SDT entry indicates an offset and a mask value used to create that table's key from the SuperKey. The offset indicates how many bytes (or bits, etc.) from the beginning of the SuperKey that the mask should be applied, which is used to block certain fields or certain parts of fields from the SuperKey from becoming part of the table's key. The resulting table key, generated based upon the application of the mask to a portion of the SuperKey identified by the offset, is then used to perform a lookup in that respective lookup/flow table. If an action of a matched entry indicates that another lookup table is to be searched, then another entry for the next table is identified in the SDT, which includes another offset and mask to be used to construct a key for the table based upon the original SuperKey. Thus, in an embodiment each generated SuperKey is preserved in memory until a forwarding decision has been made, but in another embodiment the SuperKey is discarded after creating a table key, and then re-generated for the same packet if it becomes necessary to search another flow table using another key.

In some embodiments, each entry of the SDT includes a plurality of offsets and a respective plurality of masks. In these configurations, the table key is generated by applying each of the plurality of masks to a respective subset of the SuperKey identified by the respective offset value. Then, each value resulting from the plurality of mask applications is concatenated together to form the table key, or combined in some other manner, to generate the table key.

In an embodiment, each lookup table is a hash table, and thus a hash function is applied to each table key to generate an index value that can be used to identify entries of the lookup table. However, in other embodiments, other lookup functions that are well known to those of skill in the art may instead be utilized.

In some embodiments where the network element executes as part of a network device using a NP, the maximum supported key length supported by the NP for the lookup tables might not be long enough to accommodate the entire SuperKey, so a different key length may be chosen based on the lookup requirements and table performance requirements. Further, even if the NP can support a key length of the entire size of the SuperKey, a smaller key length may be chosen because using long keys may be slower than using smaller keys and/or might consume more memory of the network element.

FIG. 1 illustrates a block diagram of a system for supporting flexible lookup keys in a software-defined network 100 according to an embodiment of the invention. This system includes a network device 102 implementing a forwarding element 106A, a controller 104 in the software-defined network 100, and one or more other forwarding elements 106B-106N. The one or more other forwarding elements 106B-106N may be implemented on one or more other general-purpose computing devices (e.g., x86 server hardware), specific-purpose network devices (e.g., routers, switches), or hybrid computing devices including aspects of both general-purpose computing devices (e.g., general purpose processors) and specific-purpose network devices (e.g., line cards, services cards, etc.). In the depicted embodiment, at least one of the forwarding elements (i.e., 106N) is implemented by the same network device 102 as forwarding element 106A, though of course this is an optional configuration and many other possible network configurations exist that do not include multiple forwarding elements on one physical network device.

At optional circle '0', the controller 104 transmits SDN protocol messages (e.g., OpenFlow messages) to a management module 132 of the forwarding element 106A. These SDN protocol messages may include a specification of which SDN lookup tables 124A-124N are required to be implemented by the forwarding element 106A, and/or identify changes to be made to already-existing lookup tables 124A-124N. Upon receipt of such messages, the management module 132 configures the lookup tables 124A-124N accordingly, and further creates and/or modifies the associated SDT entries 122 of the structure definition table 120.

At circle '1', a packet 110 is received (e.g., at a set of one or more network interfaces 140 of the network device 102) that is to be forwarded within the SDN 100. Upon receipt of this packet 110, a parse module 112 accesses the packet and, using header field definitions 114 (e.g., logic for identifying header field values), extracts the necessary packet header field values needed for the SuperKey 116. In an embodiment, these "extracted" values are copies of the relevant packet header values placed together in a sequence of bit/byte storage locations.

At circle '3', the SuperKey 116 (or, e.g., a pointer to the address of the SuperKey 116, or a signal indicating the availability of a SuperKey 116 at a known memory location) is sent to the lookup module 118.

In response, at circle '4', the lookup module 118 accesses the structure definition table 120 to identify the entry (of the one or more SDT entries 122) associated with the first lookup table to be accessed for the packet 110. In an embodiment, one of the lookup tables (e.g., lookup table 124A) is configured as the "default" table that is first searched, but in other embodiments the selection of the table to be first searched is based upon values of the packet 110 (e.g., values in the SuperKey 116). For example, the lookup module 118 may be configured with logic indicating that any SuperKey 116 including a particular VLAN ID will cause a particular lookup table (e.g., 124F) to be searched first. Of course, many other logical combinations/tests of packet header values may be utilized on an implementation specific-basis to allow custom processing of packet types applicable in each setting.

The lookup module 118 uses the identified entry of the SDT entries 122 to determine a SuperKey offset value and a SuperKey mask value. The lookup module 118 then applies the mask value to the SuperKey based upon the offset value to generate a lookup table key. This table key is used, at circle '5', to search the respective lookup table (e.g., 124A) that the lookup table key was constructed for.

At this point, an entry of the lookup table 124A may be identified (i.e., matched) by the lookup table key, and then at circle '6' the packet action module 130 will perform any actions identified by the matched entry and possibly forward the packet 110 to a next hop indicated by the matched entry, such as to one of the forwarding elements 106B-106N, or to the controller 104. In some scenarios, one of the actions to be performed may include searching another lookup table. Thus, at optional circle '7', the packet action module 130 may inform the lookup module 118 of the identity of another lookup table to be searched. Then, the process continues again at circle '4', where the lookup module 118 searches for the SDT entry associated with this "next" table to identify a SuperKey mask value and SuperKey offset value, and apply the mask value to the SuperKey 116 at the SuperKey offset value to yield a table lookup key, which will then be used to search the next table.

Figure 2:
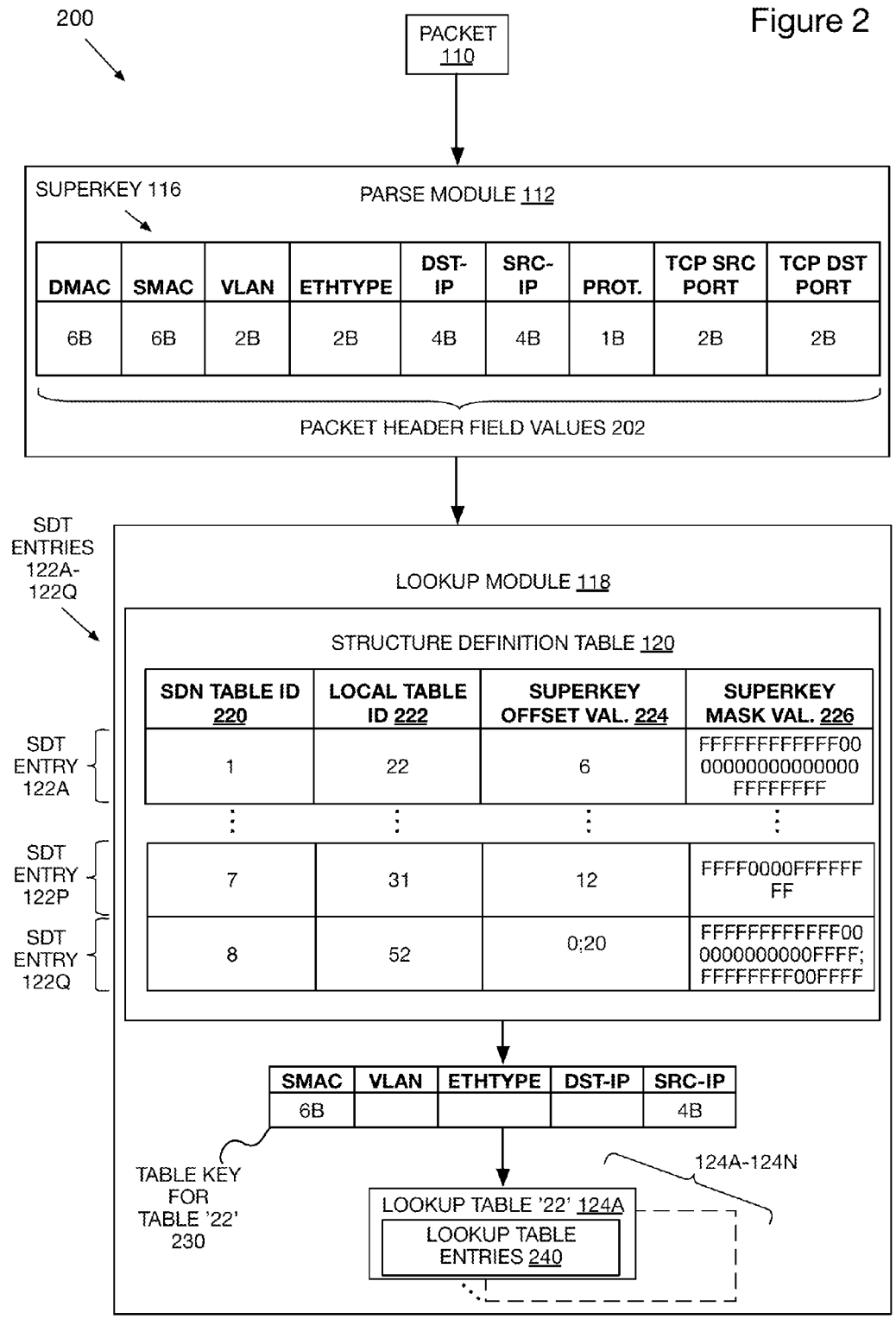
FIG. 2 illustrates a block diagram of a parse module and a lookup module in a system supporting flexible lookup keys in a software-defined network according to an embodiment of the invention.

FIG. 2 illustrates a block diagram of a parse module 112 and a lookup module 118 in a system 200 supporting flexible lookup keys in a software-defined network according to an embodiment of the invention. In this depicted example, the packet 110 arrives and the parse module 112 creates a SuperKey 116 including the following set of packet header field values 202 from the packet 110: a Destination MAC address, Source MAC address, VLAN ID, Ethernet Frame Type, Destination IP address, Source IP address, IP Protocol, TCP source port, and TCP destination port. These SuperKey header field values are then those values available to be used to construct table lookup keys for the set of SDN tables. After generating the SuperKey 116, the parse module 112 identifies the lookup module 118, which searches the SDT 120 to identify an entry (of the SDT entries 122A-122Q) for the determined table. In this example, the first entry of the SDT 120 will be used for illustrative purposes, which includes a SDN table ID 220 of '1', a local table ID 222 of '22' (an internal identifier known only to the network element of a particular table), a SuperKey offset value 224 of '6', and a SuperKey mask value 226 of 'FFFFFFFFFFFF0000000000000000FFFFFFFF'.

In this embodiment, the SuperKey Offset value 224 is a number of bytes from the beginning of the SuperKey 116 that the SuperKey mask value 226 will be applied at. For example, the SuperKey offset value 224 of '6' indicates that the mask value 226 will be applied starting at the "SMAC" field of the SuperKey 116—e.g., the "DMAC" field will purposefully be excluded from the generated table lookup key 230. Thus, the SuperKey mask value 226 (depicted here in hexadecimal), which is 18 bytes long, will be applied against a subset of the SuperKey 116 including the SMAC field (6 bytes), VLAN (2 bytes), ETHTYPE (2 bytes), DST-IP (4 bytes), and SRC-IP (4 bytes) fields to generate a table key for table '22' 230. Thus, the PROTOCOL, TCP SRC PORT, and TCP DST PORT field values will also be excluded from being in the generated table lookup key 230. By applying the SuperKey mask value 226 of this entry 122A, the SMAC field (first 6 bytes) and the Source IP field (last 4 bytes) will remain in the generated table lookup key, and the VLAN, ETHTYPE, and DST-IP field values will be eliminated (i.e., set to zero) in the generated table lookup key 230.

This generated table lookup key 230 will then be used to search the lookup table entries 240 of the respective lookup table 124A (internally identified as table '22', but known to the controller as table '1').

In some embodiments, the SDT 120 is configured to allow entries with differing sizes of SuperKey mask values 226. For example, SDT entry 122P has a SuperKey mask value 226 of 8 bytes (as opposed to the 18 bytes of the SuperKey mask value 226 of SDT entry 122A).

In some embodiments, the SDT 120 is configured to allow entries having a plurality of SuperKey offset values 224 and/or SuperKey mask values 226. For example, SDT entry 122Q includes two SuperKey offset values 224 ('0' and '20'), and two SuperKey mask values 226 of 'FFFFFFFFFFFF000000000000FFFF' and 'FFFFFFFF00FFFF'. In this example, the first mask value will include the DMAC, ignore the SMAC, and include the VLAN from the SuperKey 116 when constructing the table lookup key. The second mask value will include the SRC-IP, ignore the PROTOCOL, and include the TCP source port when constructing the table lookup key. In various embodiments, each of these plurality of masked SuperKey 116 portions will be somehow combined to generate the ultimate table lookup key. This combination, in some embodiments, includes concatenating the values together to generate the table lookup key.

Figure 3:
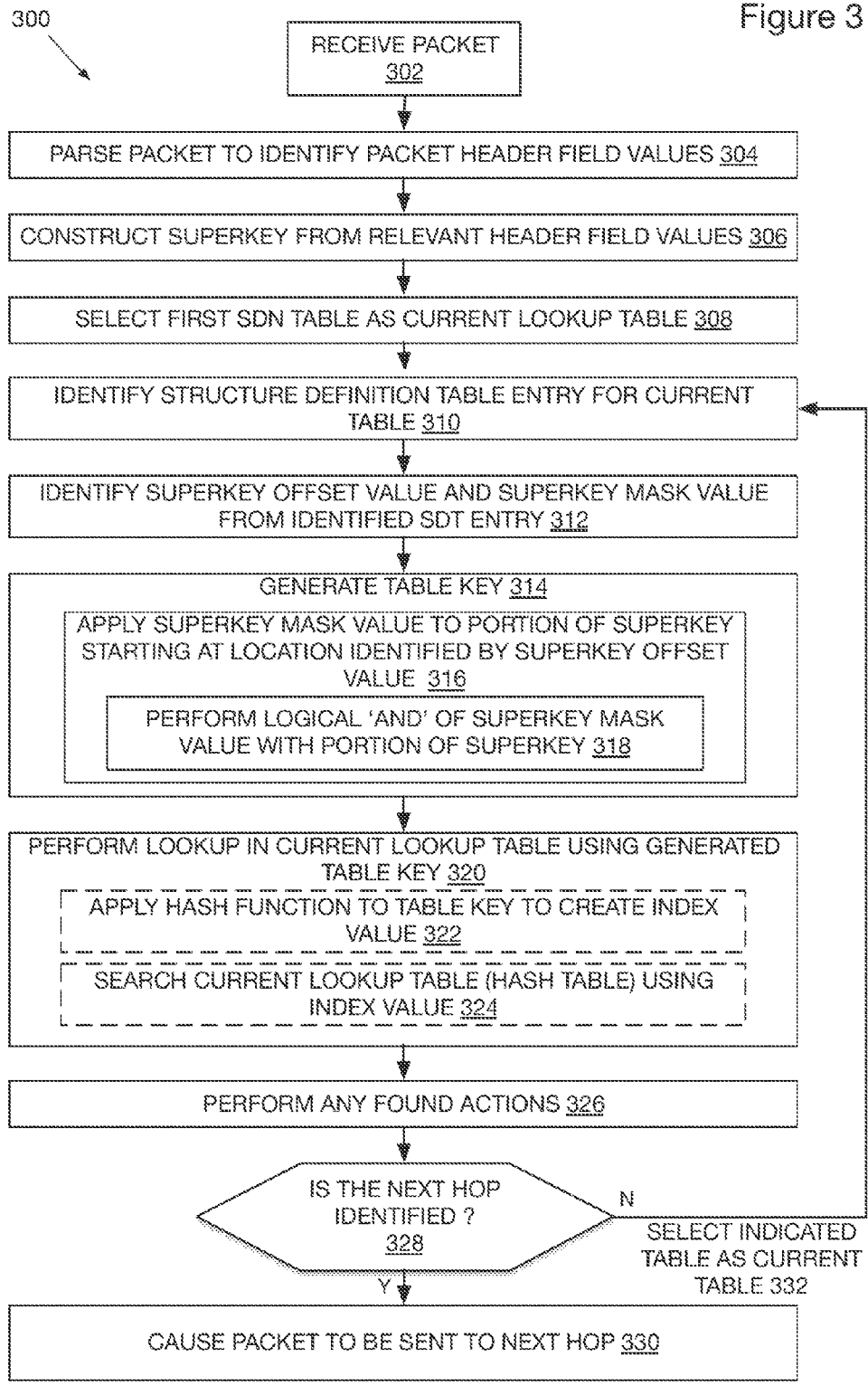
FIG. 3 illustrates a processing path within a network element in a system supporting flexible lookup keys in a software-defined network according to an embodiment of the invention.

FIG. 3 illustrates a processing path 300 in a network element in a system supporting flexible lookup keys in a software-defined network according to an embodiment of the invention. The operations of this and other flowchart diagrams will be described with reference to the exemplary embodiments of the other diagrams. However, it should be understood that the operations of the flowchart diagrams can be performed by embodiments of the invention other than those discussed with reference to these other diagrams, and the embodiments of the invention discussed with reference to these other diagrams can perform operations different than those discussed with reference to the flowchart diagrams.

At 302, the network element receives a packet to be forwarded. The network element (e.g., the parse module 112) parses the packet to identify relevant packet header field values that are defined as being used in a SuperKey. At 306, the SuperKey is constructed based upon the identified (or "extracted") relevant header field values.

At 308, the processing path includes selecting a first SDN table as the current lookup table that a table lookup key is to be generated for. In an embodiment, this table is always searched first, but in another embodiment the selection of the table is based upon fields of the SuperKey and/or packet.

At 310, the processing path includes identifying an entry of the SDT associated with the first SDN table, which may include finding the entry with a SDN Table ID 220 value matching the table identifier of the first SDN table. Using this identified entry, the SuperKey offset value and SuperKey mask value for the first SDN table are identified at 312.

Next, a table lookup key 314 is generated. In an embodiment, this includes applying the SuperKey mask value to a portion of the SuperKey starting at a location identified by the SuperKey offset value 316. In an embodiment, this includes performing 318 a logical 'AND' of the SuperKey mask value with a portion of the SuperKey starting at the byte offset identified by the SuperKey offset value. This yields a table lookup key.

At 320, the table lookup key is used to perform a lookup in the current lookup table. In an embodiment, this includes applying 322 a hash function to the table lookup key to create an index value, and searching the current lookup table (i.e., a hash table) using the index value to identify a matching entry (e.g., flow table entry of the flow that the packet belongs to).

If any actions are indicated by the identified entry, the actions (e.g., pop, push, modify, etc.) are performed at 326. If a next hop is identified 328 by the entry, the packet is caused to be sent to the next hop 330. If no next hop is identified 328, a subsequent table (e.g., a table identified by the entry, or a defined "next" table to be used after the first table) is set as the current lookup table 332, and process again continues with identifying a SDT entry for the new current lookup table at step 310.

Of course, other possible outcomes (besides sending a packet to a next hop) and flow transitions are possible, and are well known to those of skill in the field of SDN or familiar with OpenFlow (e.g, dropping the packet, incrementing counters). These possibilities are not depicted herein to avoid obscuring aspects of the invention.

Figure 4:
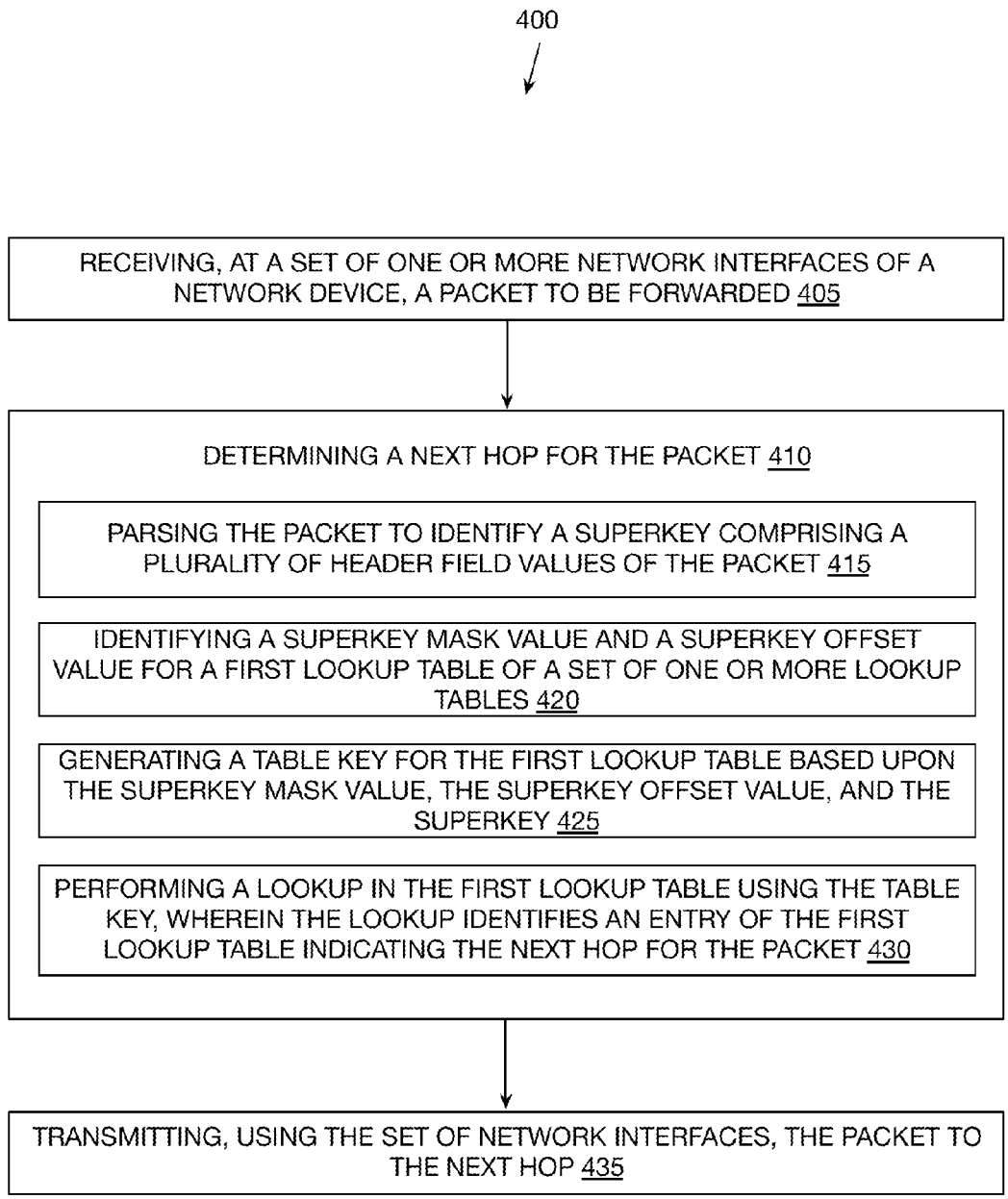
FIG. 4 illustrates another processing path within a network element in a system supporting flexible lookup keys in a software-defined network according to an embodiment of the invention.

FIG. 4 illustrates another processing path 400 in a network element in a system supporting flexible lookup keys in a software-defined network according to an embodiment of the invention. At 405, the network element receives, at a set of one or more network interfaces of the network device implementing the network element, a packet to be forwarded. At 410, the network element determines a next hop for the packet.

In an embodiment, this includes parsing 415 the packet to identify a SuperKey comprising a plurality of header field values of the packet, and identifying 420 a SuperKey mask value and a SuperKey offset value for a first lookup table of a set of one or more lookup tables. The identifying 420 may include accessing a SDT to identify a SDT entry for the first lookup table, which includes the SuperKey offset value and SuperKey mask value.

The determining 410 the next hop may also include generating 425 a table key for the first lookup table based upon the SuperKey mask value, the SuperKey offset value, and the SuperKey itself. In an embodiment, the generating 425 will include applying the SuperKey mask value to a portion of the SuperKey identified by the SuperKey offset value. The determining 410 may also include performing a lookup in the first lookup table using the generated table key, which identifies an entry of the first lookup table indicating the next hop for the packet.

At 435, the network element causes the packet to be transmitted, using the set of network interfaces, to the next hop.

FIG. 5 illustrates pseudo-code 500 used with a software definition table in a system supporting flexible lookup keys in a software-defined network according to an embodiment of the invention. The pseudo-code 500 indicates a set of operations to be performed in an embodiment of the invention to, given a particular table and a SuperKey (depicted here as function arguments), define a table lookup key ("sdnKey"), lookup an entry of the SDT using the table identifier of the selected table, copy a range of bytes from the SuperKey into the "sdnKey" as identified by the offset value, apply the identified mask by performing a logical "AND" with the content of the "sdnKey" and the mask to generate the table lookup key, and using the generated table lookup key to search the selected table.

While the flowchart diagrams in these figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network device acting as a forwarding element in a software-defined network for supporting flexible lookup table keys, the method comprising:
 receiving, at a set of one or more network interfaces of the network device, a packet to be forwarded;
 determining a next hop for the packet, wherein said determining comprises:
  parsing the packet to identify a superkey comprising a plurality of header field values of the packet,
  identifying a superkey mask value and a superkey offset value for a first lookup table of a set of one or more lookup tables,
  generating a table key for the first lookup table based upon the superkey mask value, the superkey offset value, and the superkey, and
  performing a lookup in the first lookup table using the table key, wherein the lookup identifies an entry of the first lookup table indicating the next hop for the packet; and
 transmitting, using the set of network interfaces, the packet to the next hop.

2. The method of claim 1, wherein said identifying the superkey mask value and the superkey offset value comprises:
 identifying a table entry of a plurality of entries of a structure definition table (SDT) that corresponds to the first lookup table, wherein the SDT table entry comprises the superkey offset value and the superkey mask value.

3. The method of claim 1, wherein said generating the table key comprises:
 applying the superkey mask value to a subset of bytes of the superkey identified based upon the superkey offset value.

4. The method of claim 3, wherein said applying comprises:
 performing a logical AND operation with the subset of bytes of the superkey and the superkey mask value.

5. The method of claim 3, wherein:
 said determining the next hop further comprises identifying a second superkey mask value and a second superkey offset value for the first lookup table; and
 said generating the table key for the first lookup table further comprises applying the second superkey mask value to another subset of bytes of the superkey identified based upon the second superkey offset value.

6. The method of claim 1, wherein said first lookup table comprises a hash table, and wherein said performing the lookup in the first lookup table using the table key comprises applying a hash function to the table key to generate an index value to be used to search the hash table.

7. The method of claim 1, further comprising:
 receiving, at the set of network interfaces, a second packet;
 determining a second next hop for the second packet, wherein said determining comprises:
  parsing the second packet to identify a second superkey,
  identifying the superkey mask value and the superkey offset value for the first lookup table;
  generating a second table key for the first lookup table based upon the superkey mask value, the superkey offset value, and the second superkey,
  performing a second lookup in the first lookup table using the second table key to determine to perform another lookup in a second lookup table,
  identifying a second superkey mask value and a second superkey offset value for the second lookup table,
  generating a third table key for the second lookup table based upon the second superkey mask value, the second superkey offset value, and the second superkey, and
  performing a third lookup in the second lookup table using the third table key to identify an entry of the second lookup table indicating the second next hop for the second packet; and
 transmitting, using the set of network interfaces, the second packet to the second next hop.

8. The method of claim 1, further comprising:
 receiving, at the set of network interfaces, a command from a controller in the software-defined network that indicates that the forwarding element is to configure the first lookup table;
 configuring the first lookup table according to the command; and
 configuring a table entry of a plurality of entries of a structure definition table (SDT) that corresponds to the first lookup table, wherein the SDT table entry comprises the superkey offset value and the superkey mask value.

9. A network device to act as a forwarding element in a software-defined network and support flexible lookup table keys, the network device comprising:
 a set of one or more network interfaces configured to couple the network device with the software-defined network and receive packets to be forwarded;
 a parse module coupled to the set of network interfaces and configured to generate superkeys for the received packets, wherein each superkey comprises a plurality of header field values of the respective received packet;
 a lookup module coupled to the parse module and configured to,
  identify superkey mask values and superkey offset values for one or more lookup tables of a set of one or more lookup tables,
  generate table keys for the one or more lookup tables, wherein each generated table key is to be based upon a respective superkey mask value, a respective superkey offset value, and a respective superkey, and
  perform lookups in one or more lookup tables using the table keys to identify one or both of sets of actions to be performed for the packets and next hops for the packets; and
 a packet action module coupled to the lookup module and the set of network interfaces and configured to cause the packets to be forwarded according to the lookups performed by the lookup module.

10. The network device of claim 9, wherein the lookup module, to identify the superkey mask values and the superkey offset values, is configured to:
 for each of the received packets, identify a table entry of a plurality of entries of a structure definition table (SDT) that corresponds to the respective lookup table, wherein the SDT table entry comprises the respective superkey offset value and the respective superkey mask value.

11. The network device of claim 9, wherein the lookup module, to generate the table keys, is configured to:
 apply the superkey mask values to subsets of bytes of the superkeys that are to be identified based upon the superkey offset values.

12. The network device of claim 11, wherein the lookup module, to apply the superkey mask values, is configured to:
 perform logical AND operations with the subsets of bytes of the superkeys and the superkey mask values.

13. The network device of claim 11, wherein:
the lookup module, for at least one of the one or more lookup tables, is configured to identify a plurality of superkey mask values and a plurality of superkey offset values for each received packet requiring a lookup in the at least one lookup table; and
the lookup module, to generate the table keys for each received packet requiring the lookup in the at least one lookup table, is configured to apply the plurality of superkey mask values to different subsets of bytes of the respective superkey identified by the plurality of superkey offset values.

14. The network device of claim 9, wherein:
at least some of the lookup tables comprise hash tables, and
the lookup module, to perform the lookups in the one or more lookup tables, is configured to apply one or more hash functions to the table keys to generate index values to be used to search the hash tables.

15. The network device of claim 9,
wherein the set of network interfaces is further configured to receive commands from a controller in the software-defined network that indicate that the forwarding element is to configure the lookup tables; and
wherein the network device further comprises a management module configured to:
configure the lookup tables according to the received commands, and
configure table entries of a structure definition table (SDT) that correspond to the lookup tables, wherein each of the SDT table entries comprises the respective superkey offset value and the respective superkey mask value.

16. A system, comprising:
one or more network devices acting as one or more forwarding elements in a software-defined network, wherein a first network device of the one or more network devices comprises:
a set of one or more network interfaces that couples the first network device with the software-defined network and receives packets to be forwarded;
a parse module coupled to the set of network interfaces that generates superkeys for the received packets, wherein each superkey comprises a plurality of header field values of the respective received packet;
a lookup module coupled to the parse module that,
identifies superkey mask values and superkey offset values for one or more lookup tables of a set of one or more lookup tables,
generates table keys for the one or more lookup tables, wherein each generated table key is to be based upon a respective superkey mask value, a respective superkey offset value, and a respective superkey, and
performs lookups in one or more lookup tables using the table keys to identify one or both of sets of actions to be performed for the packets and next hops for the packets, and
a packet action module coupled to the lookup module and the set of network interfaces and that causes the packets to be forwarded according to the lookups performed by the lookup module; and
a controller communicatively coupled with the one or more forwarding elements that transmits, to the one or more forwarding elements, commands that indicate a configuration of the lookup tables.

17. The system of claim 16, wherein the first network device further comprises a management module that, responsive to receiving one of the commands from the controller:
configures the lookup tables according to the command; and
configures table entries of a structure definition table (SDT) that correspond to the lookup tables, wherein each of the SDT table entries comprises the respective superkey offset value and the respective superkey mask value.

18. The system of claim 16, wherein the set of one or more lookup tables comprise hash tables.

19. The system of claim 16, wherein the lookup module, to identify the superkey mask values and the superkey offset values,
identifies, for each of the received packets, a table entry of a plurality of entries of a structure definition table (SDT) that corresponds to the respective lookup table, wherein the SDT table entry comprises the respective superkey offset value and the respective superkey mask value.

20. The system of claim 19, wherein one or more of the SDT table entries comprises a plurality of superkey offset values and a plurality of superkey mask values.

* * * * *